United States Patent [19]
Kuo et al.

[11] Patent Number: 6,154,796
[45] Date of Patent: Nov. 28, 2000

[54] APPARATUS AND METHOD IN A NETWORK INTERFACE DEVICE FOR STORING RECEIVING FRAME STATUS IN A HOLDING REGISTER

[75] Inventors: Jerry Chun-Jen Kuo, San Jose; Autumn J. Niu, Sunnyvale; Po-Shen Lai, San Jose, all of Calif.

[73] Assignee: Advanced Micro Devices, Inc., Sunnyvale, Calif.

[21] Appl. No.: 09/146,168

[22] Filed: Sep. 3, 1998

[51] Int. Cl.[7] .............................. G06F 13/14; G06F 13/00; G06F 12/00; H04L 12/28; H04L 12/56

[52] U.S. Cl. .............................. 710/52; 710/53; 710/54; 710/55; 710/56; 710/57; 710/129; 711/156; 711/129; 711/153; 370/428; 370/452

[58] Field of Search .............................. 710/56, 61, 100, 710/52, 53, 54, 57, 55, 129; 711/100, 156, 129, 153; 709/216, 250; 714/805; 370/428, 452, 392

[56] References Cited

U.S. PATENT DOCUMENTS

| | | | |
|---|---|---|---|
| 3,729,717 | 4/1973 | Koe et al. .............................. | 710/61 |
| 4,949,301 | 8/1990 | Joshi et al. .............................. | 711/100 |
| 5,206,933 | 4/1993 | Farrell et al. .............................. | 709/250 |
| 5,276,896 | 1/1994 | Rimmer et al. .............................. | 709/216 |
| 5,732,094 | 3/1998 | Petersen et al. .............................. | 714/805 |
| 6,047,001 | 4/2000 | Kuo et al. .............................. | 370/428 |
| 6,047,339 | 4/2000 | Su et al. .............................. | 710/56 |
| 6,061,767 | 5/2000 | Kuo et al. .............................. | 711/156 |

Primary Examiner—Thomas C. Lee
Assistant Examiner—Katharina Schuster

[57] ABSTRACT

A network interface device includes a random access memory used as a transmit and receive buffer for transmission and reception of data frames between a host computer bus and a packet switched network. The network interface device includes read and write controllers for each of the transmit and receive buffers, where each write controller operates in a clock domain separate from the corresponding read controller. The read and write controllers output status information corresponding to the reading or writing of a stored data frame in the receive buffer. The memory management unit includes a synchronization circuit, which arbitrates updates to the holding registers by the read and write controllers based on the asynchronously determined presence of at least one stored data frame.

17 Claims, 6 Drawing Sheets

APPARATUS AND METHOD IN A NETWORK INTERFACE DEVICE FOR STORING RECEIVING FRAME STATUS IN A HOLDING REGISTER

BACKGROUND OF THE INVENTION

TECHNICAL FIELD

The present invention relates to network interfacing and more particularly, to methods and systems for buffering data between a host bus interface and a media access controller accessing Ethernet media.

BACKGROUND ART

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO buffer prior to transmission on the network media by the MAC, and receive data is stored in a receive FIFO by the MAC prior to transfer to the host computer via the host computer bus interface.

One disadvantage with the use of a FIFO queue for a transmit buffer or a receive buffer is the increased latency encountered during the buffering process. The latency of the network interface device is the time delay between the time that a data frame is supplied to the network interface device and the time the data is transmitted on the network media, or vice versa.

An additional problem caused by the buffering of data between the clock domain of the host computer and the clock domain of the network interface device is buffer overflow or underflow. For example, buffer overflow can occur when the time domains between the host bus and the network media are uncontrollable to the extent that data is stored in the buffer at a rate faster than the data can be removed, resulting in an overflow situation. Conversely, underflow occurs if data is removed from the FIFO buffer faster than the data can be supplied.

Hence, the non-synchronous relationship between the host bus clock domain and the network clock domain have required the necessity of FIFO buffers to compensate for timing discrepancies between the host computer and the network.

An additional disadvantage with the use of a FIFO for a transmit buffer or receive buffer is the increased complexity associated with maintaining status information for each data frame stored in the FIFO buffer. If a stored data frame is to have corresponding status information, then an additional FIFO buffer may be required for storing the status information for each stored data frame. Hence, a transmit buffer may require a frame data FIFO for the actual frame data, and a status FIFO for storing the corresponding status information for each data frame. Such an arrangement would result in a substantial increase in the amount of area required on a chip for the status FIFO. In addition, additional synchronization logic would be required to maintain correspondence between the stored frame data and the corresponding status data.

Yet another disadvantage concerns the need to read a data frame in its entirety on a large portion before determining whether the data frame should be discarded or read, thereby increasing latency.

DISCLOSURE OF THE INVENTION

There is a need for an arrangement that enables use of a random access memory in a network interface device, as opposed to a FIFO buffer, to store a data frame and the corresponding status information, whereby the status information indicating the status of the stored frame is concurrently stored in a holding register.

There is also a need for an arrangement that enables storage of status information in a location (i.e., holding register) separate from random access memory, enabling a read controller to immediately determine whether to transfer the stored data frame or discard the stored data frame based on reading the corresponding status information stored in the holding register to optimize efficient use of network interface resources.

These and other needs are attained by the present invention, where a memory controller includes a holding register for selectively storing status information associated with either the writing or reading of a received data frame to and from a random access memory, based on the asynchronous detection of at least one stored data frame in the random access memory.

According to one aspect of the present invention, a method for storing status information associated with a data frame, comprises writing the frame and corresponding status information in a random access buffer memory and supplying the written status information to a holding register according to a first clock, reading the frame and the corresponding status information from the buffer memory and supplying the read status information to the holding register according to a second clock independent from the first clock, asynchronously determining a presence of at least one complete stored frame in the buffer memory, and selectively storing one of the written status information and the read status information based on the determining step. The asynchronous detection of at least one stored frame ensures that the status of stored data may be reliably maintained, despite the presence of non-synchronized clocks operating in respective clock domains. The selective storing of status information also ensures that the read status is reliably maintained despite the presence of nonsynchronized clocks.

Another aspect of the invention provides a network interface device for storing status information associated with a data frame, comprising a random access buffer memory, a write controller configured for writing the data frame into the random access buffer memory according to a first clock and outputting status information of said frame, a read controller configured for reading the stored data frame from the random access buffer memory according to a second clock independent from the first clock and outputting status information corresponding to the stored data frame, and a synchronization circuit asynchronously determining a presence of at least one stored data frame in the random access buffer memory, the synchronization circuit comprising a holding register and a selection circuit, the selection circuit configured for selectively storing into the holding register one of the status information output from the read controller and the status information output from the write controller. Use of the selection circuit and the synchronization circuit to selectively store the status information from the read controller or write controller in the holding register enables the synchronization circuit to reconcile potential arbitration issues between the controllers operating in their respective clock domains by granting priority to the write controller to store the corresponding status information if a full data frame is not stored in the random access memory, while granting priority to the read controller if at least one frame is stored in the random access memory. By storing the status information in a holding register, separate from the random access memory, the read controller may quickly examine whether the data frame should be read or discarded. Hence, the present invention provides the advantages of random access memory over FIFO-based buffers, including faster access speeds, smaller memory sizes and faster flushing of non-relevant data, without the introduction of synchronization or memory contention problems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface device in a packet switched network, such as an Ethernet (IEEE 802.3) network. The description will first be given of the network interface device architecture, followed by the arrangement for selectively storing status information in a holding register based on an asynchronous determined presence of at least one complete stored data frame. It will become apparent, however, that the present invention is also applicable to other network interface device systems, especially frame based data communication systems (e.g., token ring (IEEE 802.5), fiber distributed data interface (FDDI), etc.).

NETWORK INTERFACE ARCHITECTURE

Figure 1:
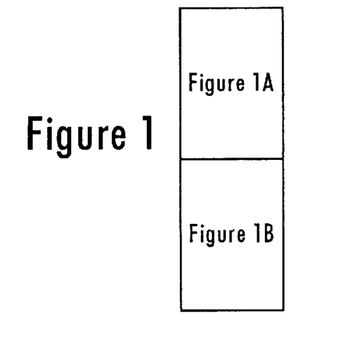
FIGS. 1A and 1B are, respectively, the upper and lower portions of a block diagram illustrating an exemplary network interface device including a synchronization circuit for controlling buffer memory controllers according to an embodiment of the present invention.
Figure 1A:
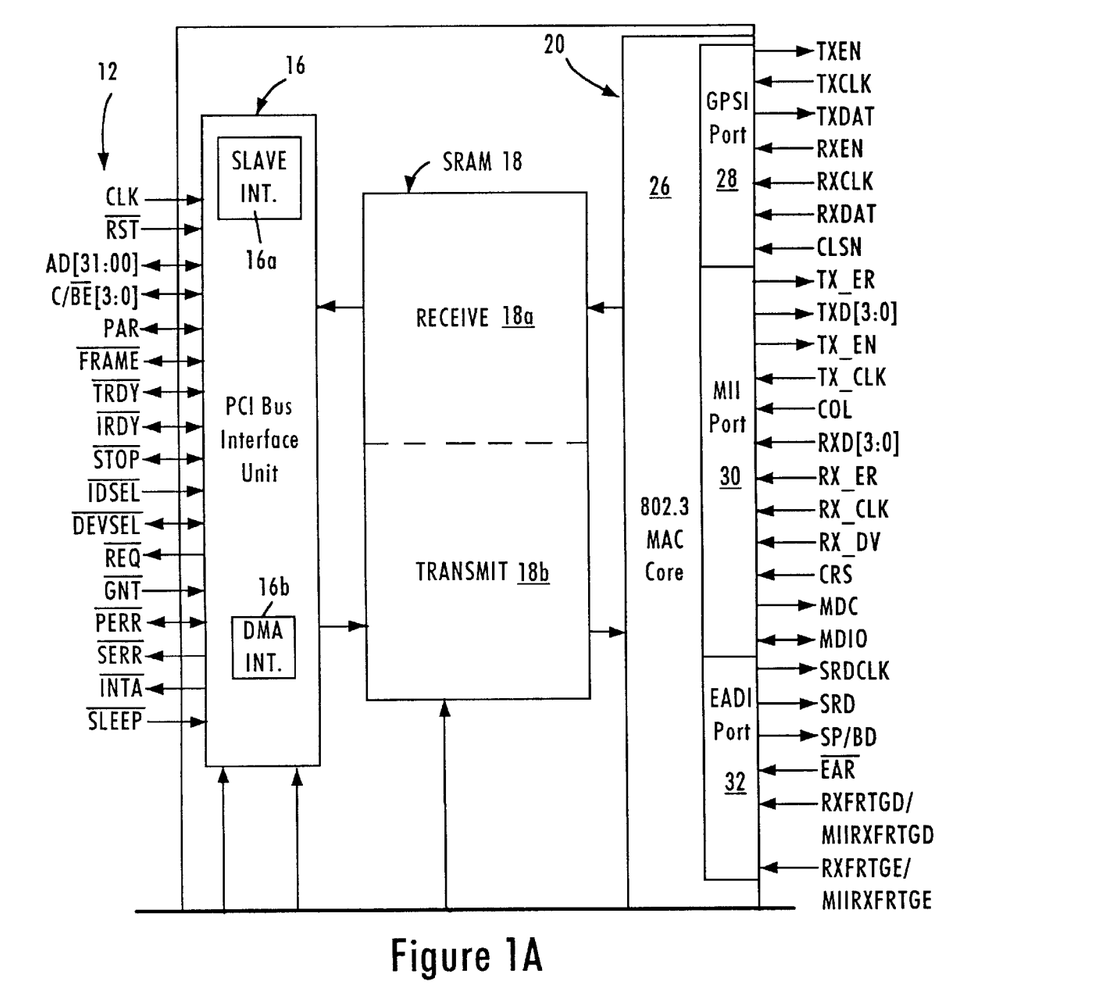
Figure 1B:
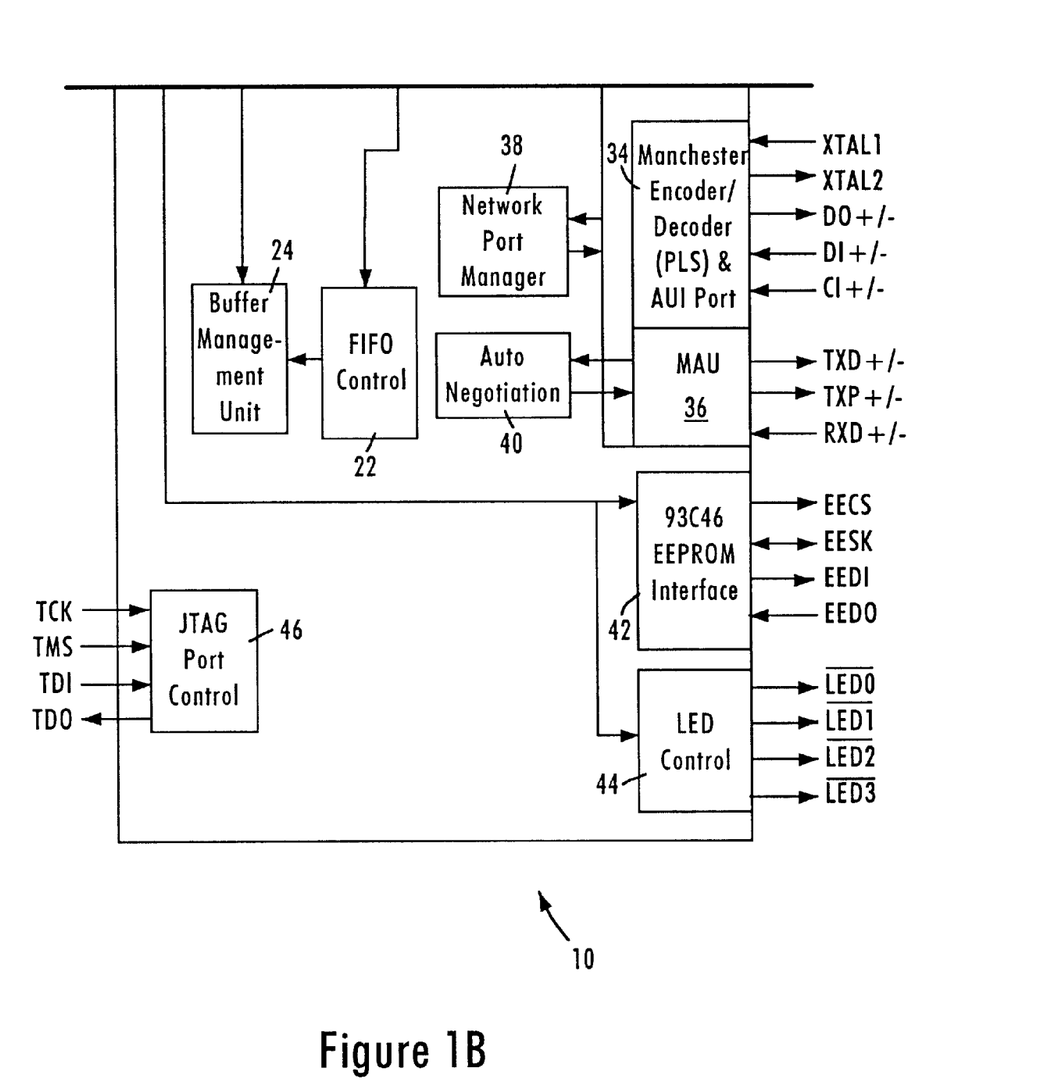

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a media access controller interface device (MAC) 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The MAC 20 includes a MAC core 26, a general purpose serial interface (GPSI) 28, a media independent interface (MII) 30 for connecting to external 10 Mbps or 100 Mbps physical (PHY) transceivers, an external address detection interface (EADI) 32, an attachment unit interface (AUI) 34 having a Manchester encoder and decoder, and a 10/100 Mbps twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mbps, 100 Mbps, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

MEMORY MANAGEMENT ARCHITECTURE

Figure 2:
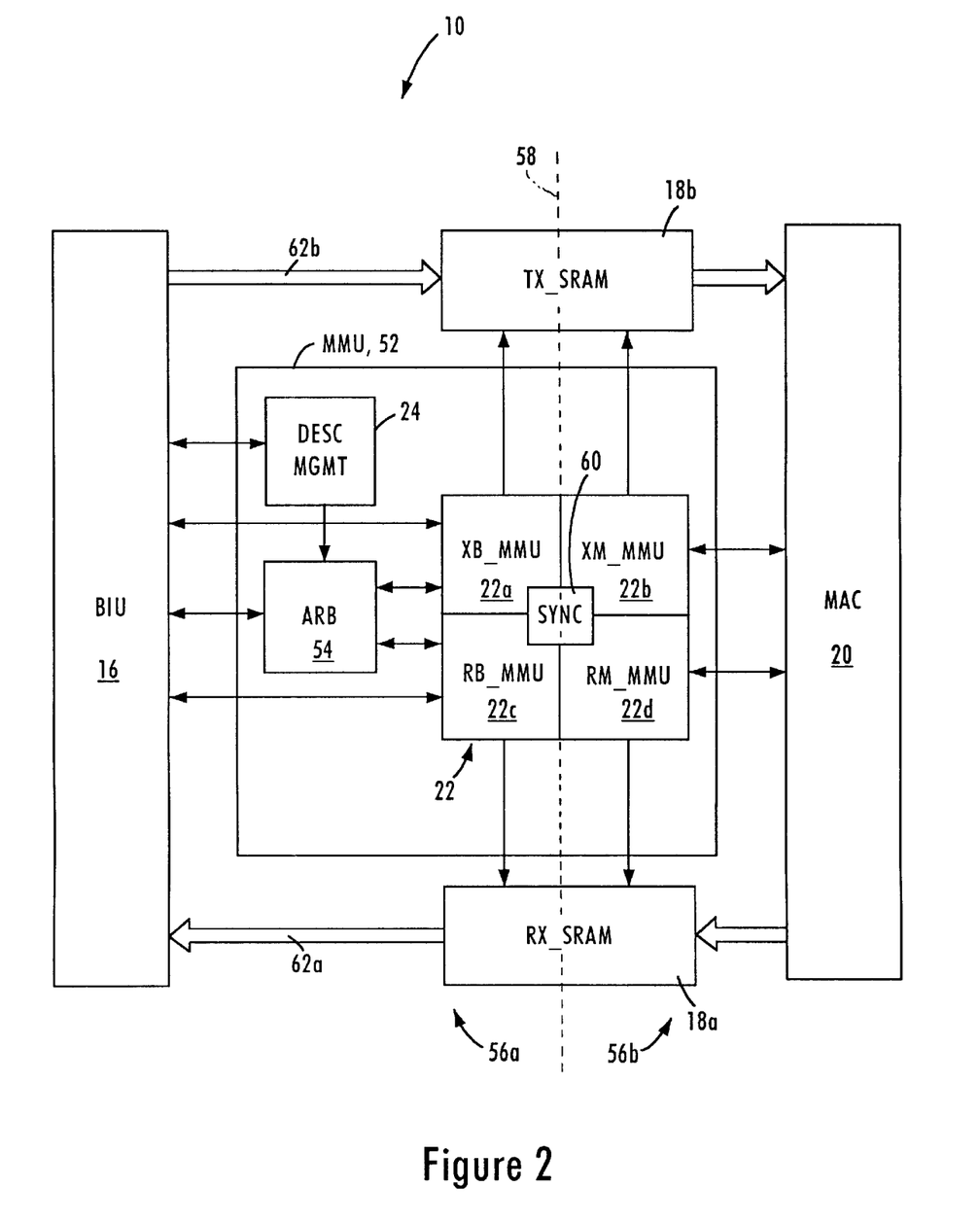
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3A:
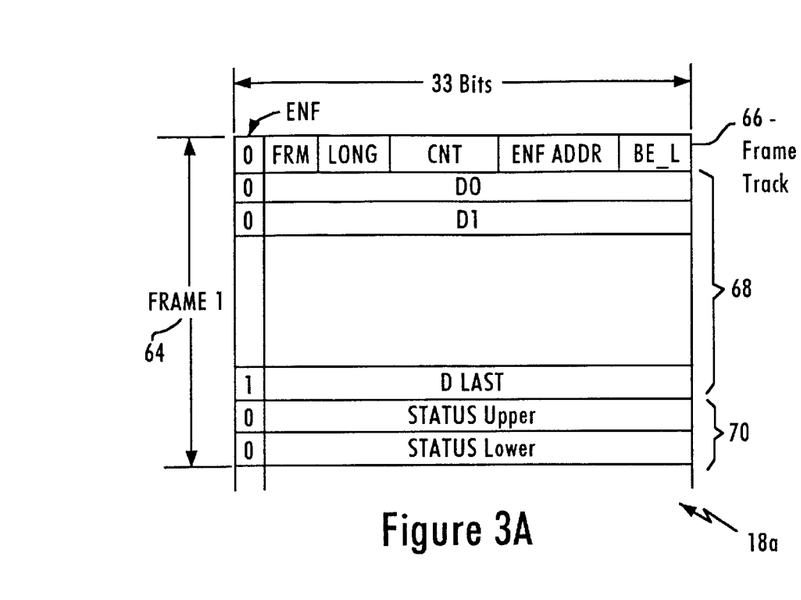
FIGS. 3A and 3B are diagrams illustrating exemplary alternative data structures of a data frame stored in the random access memory of FIGS. 1 and 2.
Figure 3B:
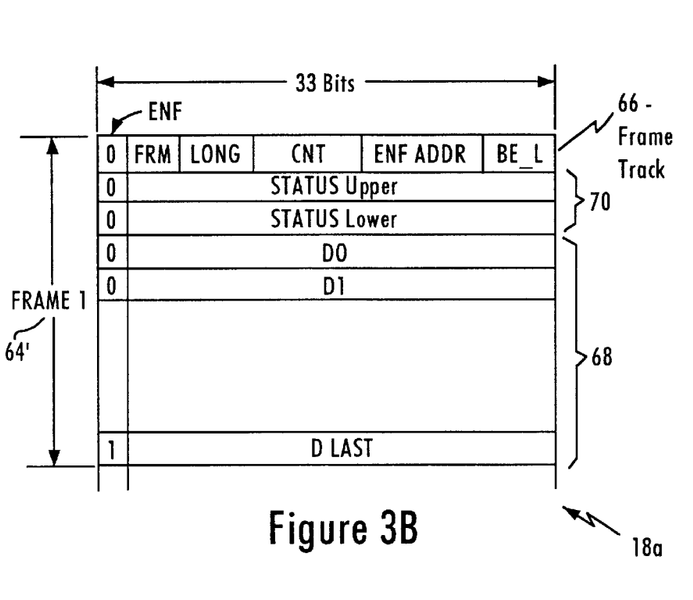

FIG. 3A is a diagram illustrating a data structure of a receive data unit in the RX_SRAM 18a according to one embodiment. A similar structure also may be used for storing data in the TX_SRAM 18b. As shown in FIG. 3A, each stored data frame 64 includes a frame track field 66 preceding a group of data bytes representing the frame data 68 (i.e., the packet data to be transmitted by the MAC 20), followed by a status information field 70. In this case, the RM_MMU 22d stores frame track information 66 and the control field 70 related to the receive data frame 68. The frame track field 66 is used by the RB_MMU 22c to keep track of the location of the corresponding receive data frame 68 in the RX_SRAM 18a. Hence, the frame track 66 enables the RB_MMU 22c to quickly flush a stored data frame 64 having receive data 68 and jump to the beginning of the next stored data frame (e.g., $64_2$), based on an end of frame address field (ENF ADDR), a count (CNT) field specifying the number of DWORDS (D0, D1, ..., DLAST), and an end of frame (FRM) bit indicating whether the data frame 64 contains valid data ready for reading. The byte enable-last field (BE_L) specifies how many of the bytes in the DLAST field are valid. Alternatively, the status information field 70 may follow the frame track 66, as shown in FIG. 3B. This data structure allows the status information to be read without having to retrieve the entire data field 68, thereby reducing processing time in situations where the data field contains invalid data.

As described below, each data unit 64 is written by first reserving the contiguous buffer memory locations for the double word Status 0, Status 1 (together forming the status information 70), and the frame track 66 by writing, for example, null values into the first three contiguous memory locations, as shown in FIG. 3B. The memory controller (RM_MMU) 22d then writes the frame data in 32-bit wide double word format into the contiguous buffer memory locations 68 following the corresponding locations for the status information 70 and the frame track field 66. The memory controller 22d continues to write the 32-bit wide frame data fields in the contiguous locations D0, D1, etc. until reception of an end of frame (RM_ENF) signal from the MAC 20. In response to the end of frame (RM_ENF) signal, the memory controller (RM_MMU) 22d jumps to the first buffer memory location (Status 0—i.e., STATUS Upper), receives the status information from the media access controller, and writes the first and second portions of the status information 70 into the first and second buffer memory locations (status 0 and status 1 (i.e., STATUS Lower)), respectively. The memory controller 22d then updates the frame track field 66, then jumps to reserve the next contiguous memory locations for the status information 70 and frame track field 66 for the next received data frame (e.g., $64_2$).

Figure 3C:
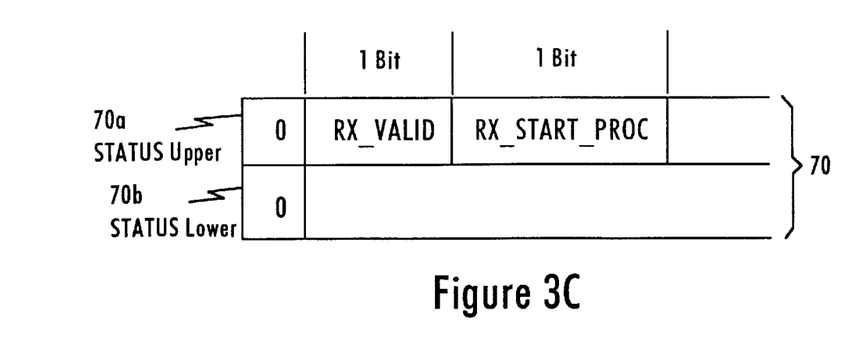
FIG. 3C illustrates in detail the status information field of the stored data frame.

The status information, contained in the two DWORDS 70, is used to provide slave receive status to the host CPU during slave transfers. The status information may also be used by the descriptor management unit 24 to supply DMA receive status during DMA transfers. As shown in FIG. 3C, the STATUS Upper word 70a comprises two bits, namely RX_VALID and RX_START_PROC. The RX_VALID bit indicates that the status data is valid when the bit is set to 1. The write controller, RM_MMU 22d, sets RX_VALID to 1 after the last byte of a receive frame 68 has been written to RX_SRAM 18a. The RX_START_PROC (i.e., start processing) bit, when set to 1, indicates that processing of the head of the next frame in the RX_SRAM can begin. The RX_START_PROC and RX_VALID have an interdependency such that when the RX_VALID bit is 1 only the RX_START_PROC bit is valid.

According to the disclosed embodiment, these two bits (RX_VALID and RX_START_PROC) are obtained independent from the MAC. Specifically, the RX_VALID is set to the same value as the FRM bit of the frame track. The RX_START_PROC bit is based upon the following signals: RX_SLV_OPTIM_INT (Slave Optimum Interrupt), RX_DMA_OPTIM_INT (DMA Optimum Interrupt), and RX_FRM_ONEM (receive frame one or more). The RB_MMU generates the RX_SLV_OPTIM_INT. The RX_DMA_OPTIM_INT signal is outputted from the RM_MMU. The synchronization circuit 60 produces the RX_FRM_ONEM. The RX_VALID and RX_START_PROC bits, which occupy bit positions 31 and 30 respectively, are stored in the Status 0 holding register 84a as a part of the upper DWORD.

The discussion below details the concurrent storage of the status information in holding registers during reading and writing operations of the RX_SRAM.

SYNCHRONIZATION CIRCUIT OPERATION

According to the disclosed embodiment, the synchronization circuit 60 includes a read counter and a write counter for each transmit SRAM (TX_SRAM) 18b and receive SRAM (RX_SRAM) 18a, where each counter is configured for counting a number of written (or read) frames by changing a single bit of a counter value in response to a corresponding signal from the associated MMU controller.

Figure 4:
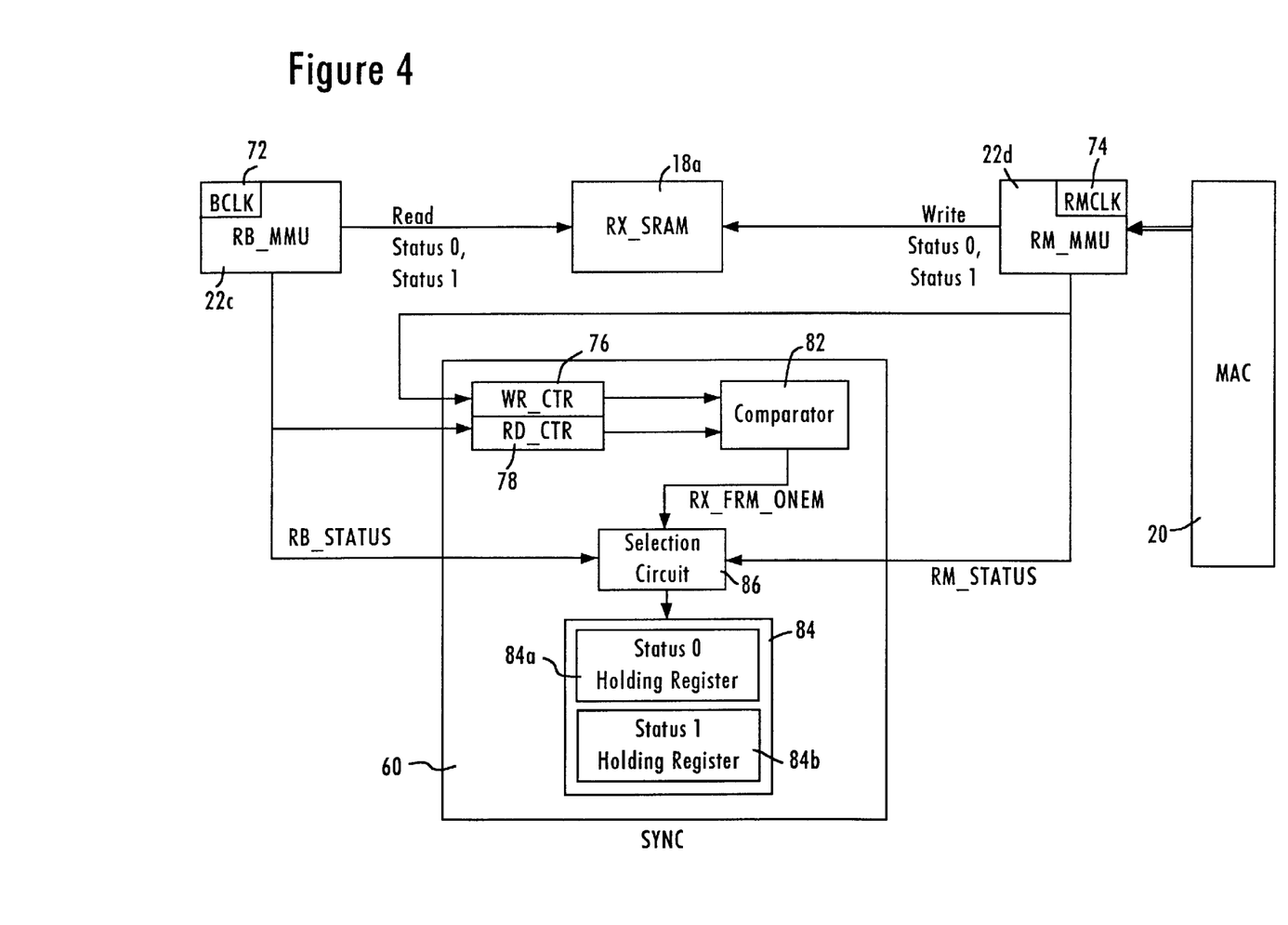
FIG. 4 is a block diagram illustrating the use of holding registers in accord with the present invention.

FIG. 4 is a block diagram illustrating operation of the synchronization circuit 60 with the read and write controllers for the RX_SRAM 18a according to an embodiment of the present invention. As shown in FIG. 4, the write controller (RM_MMU) 22d for the RX_SRAM 18a is configured for writing a frame (e.g., the data frame 64) into the RX_SRAM 18a according to a receive MAC clock (RMCLK) 74 synchronized relative to the network clock domain 56b. The write controller 22d, upon writing an entire data frame 64 into the RX_SRAM 18a, outputs a write signal to the synchronization circuit 60 indicating the completed writing of the data frame 64. Specifically, the write controller 22d writes the data frame 64 in FIG. 3A by receiving the frame data 68 from the MAC 20 according to the RMCLK 74. The write controller 22d then reserves a portion of the prescribed memory location 64 of the RX_SRAM 18a by first writing null data for the frame track 66 to hold header information. Further, the write controller, in one embodiment, may also write null data for the status information 70, reserving memory locations contiguous to the location that stores the frame track. The actual frame data 68 is then written (location "Y"), followed by status information 70 (at location "Z"). Following the writing of the status information 70 at location "Z", the write controller 22d then returns to the frame track field 66 at location "X" and updates the frame track with the appropriate header information, including setting the end of frame address (ENF ADDR), updating the count (CNT) field indicating the number of DWORDS in the frame, the frame bit (FRM), and the ENF bit indicating that the memory location 64 stores valid data.

After writing the frame data 68 into memory, the write controller (RM_MMU) 22d writes the status information (RX_STATUS Lower and RX_STATUS upper) into the reserved fields 70 of the RX_SRAM 18a, and concurrently supplies the status information to the synchronization circuit 60 for storage in the holding register 84. Although reference is made to a single holding register 84, any number of registers may be used to accommodate the true field length of the status information. That is, the holding register has the same bit length as the status information fields. The disclosed embodiment utilizes two holding registers 84a, 84b, each having a 32 bit length. Status 0 holding register 84a stores the RX_STATUS upper field; similarly, Status I holding register 84b stores the RX_STATUS lower field.

The write controller 22d outputs the write signal to the synchronization circuit 60 after updating the frame track field 66, at which point the SRAM 18a stores a valid data frame 64 at a prescribed location. Successive writing of frames results in the RM_MMU 22d outputting a plurality of respective status values (RX_STATUS lower and RX_STATUS upper) to the holding registers 84a, 84b. Assuming, however, that the read controller 22c attempted to read the first frame F1 from the memory location 64 prior to completion by the write controller 22d, the read controller 22c would obtain invalid data, since the status information field 70 would not yet be updated with valid data. In addition, the read controller 22c, upon accessing the status information 70 corresponding to a stored frame 64, supplies the read status information from the accessed memory location to the synchronization circuit 60 in order to indicate the read status. Hence, invalid status information could be written to the holding registers 84a, 84b if the read controller 22a attempted a read operation before completion of the corresponding write operation.

According to the disclosed embodiment, the synchronization circuit 60 determines a presence of a complete stored data frame 64 in the random access memory 18a in response to read and write signals and independent of the bus clock 72 and the MAC clock (RMCLK) 74. Specifically, the synchronization circuit 60 includes a write frame counter 76 configured for changing a single bit of a write counter value in response to the write signal output from the write controller 22d. The synchronization circuit 60 also includes a read frame counter 78 configured for changing a single bit of a read counter value in response to the read signal from the read controller 22c. As described above, the read controller 22c is configured for reading the frame 64 from the receive SRAM 18a according to a host bus clock (BCLK) 72, where the read controller 22c outputs a read signal to the synchronization circuit 60 in response to the reading of the frame.

According to the disclosed embodiment, the write frame counter 76 and the read frame counter 78 are implemented as gray code counters, such that only a single bit of a counter value is changed in response to assertion of the status signal from the corresponding memory controller 22. Use of the gray code counter ensures that any asynchronous comparison between the write frame counter 76 and the read frame counter 78 does not result in any erroneous values due to multiple bit transitions that may otherwise occur in counters using binary-format representations.

The gray code counters 76 and 78 output their respective counter values to an asynchronous comparator 82, composed of a plurality of exclusive OR gates. The comparator generates a comparison result indicating the presence of a stored frame based on the first and second counter values, such that the comparator 82 outputs a one or more received frame signal (RX_FRM_ONEM) indicating the presence of at least one stored frame in the receive SRAM 18a if the stored counter values from the write counter 76 and the read counter 78 are unequal.

STORING STATUS INFORMATION

The purpose of the holding register 84 is to hold status information for the current frame being read from the RX_SRAM 18a. Hence, the synchronization circuit 60 needs to be able to ensure that only valid data is written into the holding register 84 (i.e., status information data written into the status information field 70 after having written a complete data frame).

According to the disclosed embodiment, the synchronization circuit 60 includes a selection circuit 86 for selectively storing either the status information (RM_STATUS) generated by the write controller (RM_MMU) 22d, or the status information (RB_STATUS) generated by the read controller (RB_MMU) 22c. The selection circuit 86 selectively supplies either the status information from the write controller or the status information from the read controller to the holding registers 84a, 84b based on an asynchronous detection of at least one stored data frame in the receive memory 18a. If the memory 18a stores less than a complete frame of data then the comparator 82 outputs the one-or-more signal as having a value of RX_FRM_ONEM=0, and the selection circuit 86 in response grants priority to the write controller 22d by supplying the RM_STATUS information to holding registers 84a, 84b. Conversely, the selection circuit 86 grants priority to the read controller 22c by supplying the corresponding status information (RB_STATUS) to the holding registers 84a, 84b in response to the one or more signal equal to one or more frames are stored in memory 18a.

The use of a status holding register 84, that is resident in the synchronization circuit 60, provides a more efficient read operation by the read controller RB_MMU 22c. During a write operation by RM_MMU 22d to the RX_SRAM 18a, the STATUS Upper and STATUS Lower fields 70, denoted Status 0 and Status 1 respectively in the FIG. 4, are concurrently written to the holding registers 84a, 84b. These holding registers 84a and 84b are also updated by the RB_MMU 72 when it performs a read of the RX_SRAM 18a. As the read controller 22c retrieves data frames, it writes the status information data into the holding registers 84a, 84b. Consequently, the receive frame status can be immediately accessed and updated without needing to manipulate the receive buffer pointer back and forth. Hence, overall latency of the network interface device is reduced.

Figure 5:
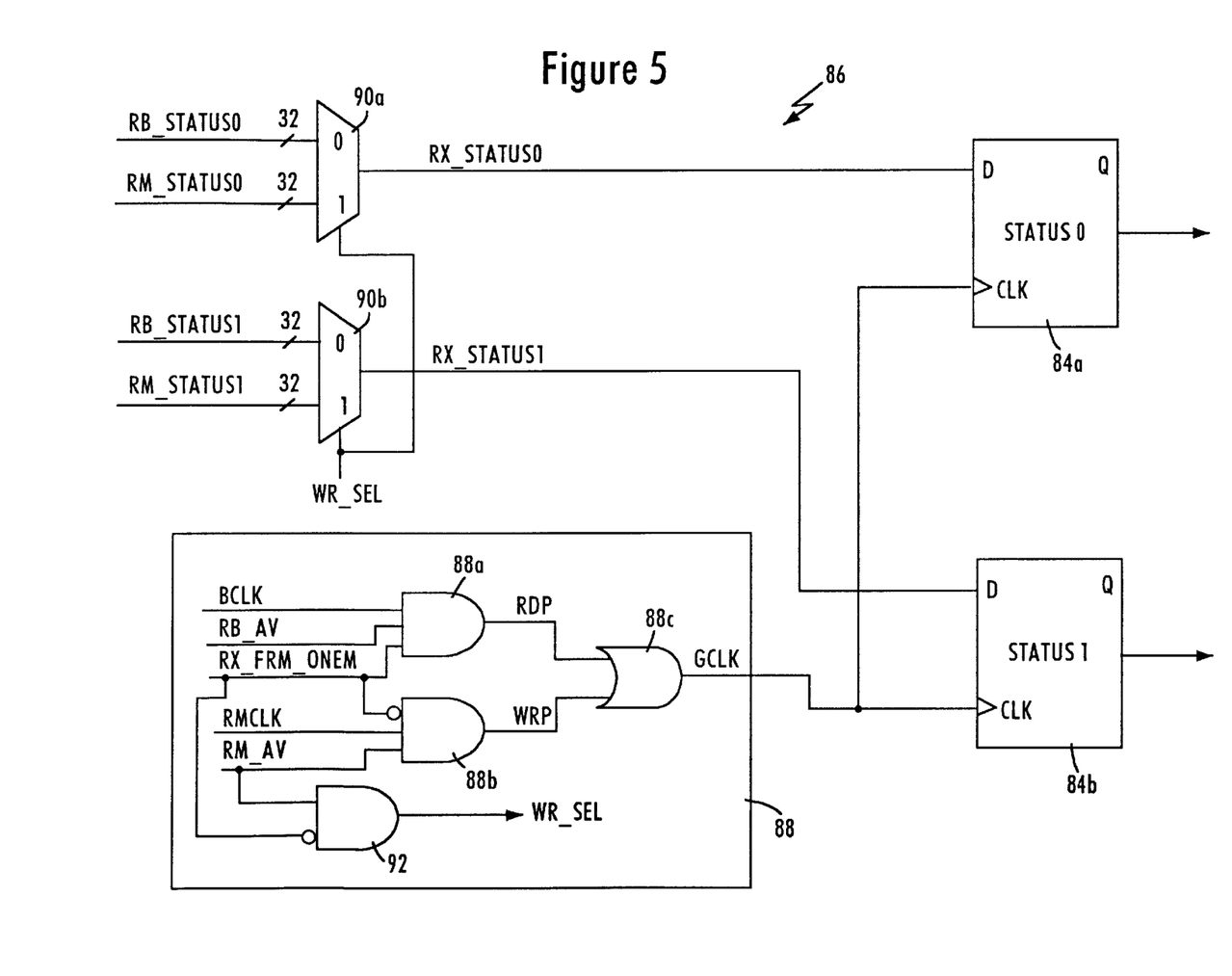
FIG. 5 is a block diagram illustrating the selection circuit and holding register in the synchronization circuit of FIG. 4.

FIG. 5 is a block diagram illustrating the selection circuit 86 and the holding registers 84a, 84b according to an embodiment of the present invention. As shown in FIG. 5, the selection circuit 86 includes a generic clock circuit 88 configured for supplying a gated clock signal (GCLK) based upon the bus clock (BCLK), the receive MAC clock (RMCLK), and the one-or-more signal (RX_FRM_ONEM) from the comparator 82. Specifically, the generic clock circuit 88 includes AND gates 88a and 88b for generating read priority and write priority signals, respectively, and an OR gate 88c for generating the gated clock signal based on the priority signals output by the AND gates 88a and 88b. The AND gate 88a outputs a read priority (RDP) signal synchronous with the bus clock (BCLK) if the one or more signal equals one, (e.g., RX_FRM_ONEM=1) and the read controller 22c outputs an availability signal (RB_AV) indicating availability of the status signal (RB_STATUS). The AND gate 88b performs the same operation for the write controller 22d, namely outputting a write priority (WRP) signal synchronous with the receive MAC clock (RMCLK) upon the availability of the status signal from the write controller 22, as indicated by the signal RM_AV=1, and when the one or more signal equals zero (e.g., RX_FRM_ONEM=0).

The selection circuit 86 further includes input selectors 90a, 90b for selectively supplying either the status information from the read controller 22c (RB_STATUS) or the status information generated by the write controller 22d (RM_STATUS) as an output signal (RX_STATUS0 and RX_STATUS 1) in response to a selection signal (WR_SEL). Specifically, input selector 90a receives the upper status information words, RB_STATUS0 and RM_STATUS0, as inputs and outputs RX_STATUS0. Likewise, the input selector 90b for the lower status information word outputs RX_STATUS1 based upon inputs RB_STATUS1 and RM_STATUS1. Both input selectors 90a, 90b receive the same selection signal WR_SEL. The selection signal WR_SEL is generated by an AND gate 92 based on the one or more signal (RX_FRM_ONEM). Hence, if the one or more signal equals one, then the select signal is zero (WR_SEL=0), such that priority is given to the read controller 22c to supply the corresponding status information to the holding register 84. However, if the one or more signal equals zero the selection signal (WR_SEL) is set to one when the frame track information is available from the RM_MMU 22d. Once the status information is made available, the RM_STATUS information is supplied to the holding registers 84a, 84b concurrent with the write priority signal output by the AND gate 88b, output by the OR gate 88c as a generic gated clock signal (GCLK) to holding registers 84a, 84b concurrent with the status information from the RM_MMU 22d.

The holding registers 84a, 84b are 32-bit delay flip flops that store the updated status information (RX_STATUS0 and RX_STATUS1) from the selectors 90a, 90b in response to the gated clock signal (GCLK) output by the clock circuit 88.

Storage of the status information in the holding registers 84a, 84b enables a read controller (such as the RB_MMU 22c) or a host performing a slave transfer, to access the received frame status before actual retrieval of the received frame data. In addition, rapid and efficient data transfers can be performed from the SRAM 18a by a host operating the network interface device in slave mode, since determination of whether to read a stored data frame or "flush" the frame can be quickly determined by reading the status and the frame track fields, and then merely incrementing a read pointer to begin retrieval of the stored frame data 68.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for storing status information associated with a data frame, the method comprising:

writing the frame and corresponding status information in a random access buffer memory and supplying the written status information to a holding register according to a first clock;

reading the frame and the corresponding status information from the buffer memory and supplying the read status information to the holding register according to a second clock independent from the first clock;

asynchronously determining a presence of at least one complete stored frame in the buffer memory; and selectively storing one of the written status information and the read status information based on the determining step.

2. The method of claim 1, wherein the status information comprises a valid status bit and a start processing bit.

3. The method of claim 2, wherein the valid status bit and the start processing bit are set independent from a media access control.

4. The method of claim 2, further comprising generating the valid status bit, and the start processing bit by a write controller in a network interface.

5. The method of claim 1, wherein the selectively storing step comprises:

storing the written status information if said determining step does not determine the presence of at least one complete stored frame; and storing the read status information if said determining step does determine the presence of at least one complete stored frame.

6. The method of claim 1, wherein the storing step further comprises:

generating a first gated clock signal in response to a write availability signal from a write controller, the first clock, and a signal indicating the absence of at least one complete stored frame;

generating a second gated clock signal in response to a read availability signal from a read controller, the second clock, and a signal indicating the presence of at least one complete stored frame; and writing the status information into the holding register in response to one of the first gated clock signal and the second gated clock signal.

7. The method of claim 1, wherein said determining step comprises generating a stored frame signal in response to the determined presence of said at least one complete stored frame.

8. The method of claim 7, further comprising supplying the stored frame signal as a selection input to a selection circuit for selecting the status information associated with the written frame or the read frame.

9. The method of claim 8, wherein the storing step further comprises:

outputting the selected status information from the selection circuit as an input to the holding register;

generating a generic gated clock signal based on the stored frame signal, the first clock, and the second clock; and storing the input to the holding register in response to the generic gated clock signal.

10. The method of claim 1, further comprising:

supplying a first part of the status information from a media access control; and generating a second part of the status including a valid status bit and a start processing bit independent from the media access control.

11. A network interface device for storing status information associated with a data frame, comprising:

a random access buffer memory;

a write controller configured for writing the data frame into the random access buffer memory according to a first clock and outputting status information of said frame;

a read controller configured for reading the stored data frame from the random access buffer memory according to a second clock independent from the first clock and outputting status information corresponding to the stored data frame; and a synchronization circuit asynchronously determining a presence of at least one stored data frame in the random access buffer memory, the synchronization circuit comprising a holding register and a selection circuit, the selection circuit configured for selectively storing into the holding register one of the status information output from the read controller and the status information output from the write controller.

12. The network interface device of claim 11, wherein the synchronization circuit comprises a detection circuit for asynchronously determining the presence of the at least one complete data frame, the detection circuit outputting a signal indicating the presence of the at least one complete data frame.

13. The network interface device of claim 11, wherein the selection circuit comprises:

a generic clock circuit configured for supplying a generic gated clock signal based on the first clock, the second clock, and the signal; and an input selector for selectively supplying the status information to the holding register based on the signal, wherein the holding register store the supplied status information in response to the generic gated clock signal.

14. The network interface device of claim 11, wherein the synchronization circuit further comprises an asynchronous frame detector configured for detecting the presence of the at least one stored data frame independent of the first and second clocks.

15. The network interface device of claim 11, further comprising:

a media access controller for supplying the frame and the first clock from a network media; and a host bus interface for transferring the frame from the buffer memory and for supplying the second clock from a host bus.

16. The network interface device of claim 11, wherein the valid bit and the start process bit are independent of a media access control.

17. The network interface device of claim 11, wherein the frame comprises tracking information, the valid bit being derived from the tracking information, and the start processing bit being derived from signals outputted from the read controller, the write controller, and the synchronization circuit.

* * * * *

UNITED STATES PATENT AND TRADEMARK OFFICE
CERTIFICATE OF CORRECTION

PATENT NO. : 6,154,796
DATED : November 28, 2000
INVENTOR(S) : Jerry Chun-Jen KUO, et al.

It is certified that error appears in the above-identified patent and that said Letter Patent is hereby corrected as shown below:

On the Title Page, Item [54], the Title , is incorrect. It should read as follows:

[54] APPARATUS AND METHOD FOR SELECTIVELY STORING STATUS INFORMATION ASSOCIATED WITH A DATA FRAME IN A HOLDING REGISTER BASED ON AN ASYNCHRONOUS DETERMINING STEP

Signed and Sealed this

First Day of May, 2001

*Attest:*

NICHOLAS P. GODICI

*Attesting Officer*  *Acting Director of the United States Patent and Trademark Office*